United States Patent [19]

Zahid

[11] 4,298,029
[45] Nov. 3, 1981

[54] PRESSURE PULSE DAMPENER DEVICE

[75] Inventor: Abduz Zahid, Los Angeles, Calif.

[73] Assignee: Greer Hydraulics, Incorporated, Chatsworth, Calif.

[21] Appl. No.: 78,014

[22] Filed: Sep. 24, 1979

[51] Int. Cl.³ ............................................. F16L 55/04
[52] U.S. Cl. .................................................... 138/30
[58] Field of Search ........................................ 138/30

[56] References Cited

U.S. PATENT DOCUMENTS 3,782,418   1/1974   Zahid .................................... 138/30
4,080,996   3/1978   Zahid .................................... 138/30

Primary Examiner—Steven L. Stephan
Attorney, Agent, or Firm—Arthur B. Colvin

[57] ABSTRACT

This invention relates to an improved pressure pulse dampener device comprising a pressure vessel having a movable partition therein dividing the vessel into two chambers, each chamber having a port in communication therewith, namely, a gas port for charging one of said chambers with gas under pressure and an oil port. The oil port is rigidly secured to a hollow fitting having an inlet and an outlet port, with means interposed between the ports for diverting the flow toward the oil port, the device being characterized by the provision within the fitting of an expansion chamber having a progressively increased cross section area juxtaposed to a baffle interposed between the inlet and outlet ports, the chamber providing improved dampening characteristics.

4 Claims, 3 Drawing Figures

PRESSURE PULSE DAMPENER DEVICE

BACKGROUND OF THE INVENTION

1. Field of the Invention

The present invention is in the field of pulsation dampening devices. As conducive to an understanding of the invention, it is noted that in hydraulic systems utilizing pumps, especially those of the piston type, pulses are generated, the amplitude and frequency of which are dependent upon the displacement, speed and number of pistons in the pump. Where the pulse frequency and/or amplitude are high and the resultant pulses are permitted to propagate throughout the entire system without control, the repeated shocks imparted to the components of the system, such as fittings, valves, pipes, etc., can cause leakage and possible breakage of lines and other damage to the system components.

2. The Prior Art

In order to minimize damage due to the pulses in the hydraulic system, it is conventional to interpose a pressure pulse dampener device in the hydraulic system. Such devices typically comprise pressure vessels divided into two chambers, one chamber of which is filled with gas under pressure and the other chamber of which is communicated to the hydraulic line. When pressures of a predetermined magnitude are encountered, which magnitude exceeds the pressure within the gas chamber (e.g. the occurrence of a pulse), hydraulic fluid is permitted to flow into the hydraulic chamber, further compressing the gas. The energy imparted to the gas, after the pressure drops in the hydraulic system, is returned to the hydraulic fluid, with the result that a more even pressure condition exists in the hydraulic fluid downstream of the pulsation dampener.

An advanced form of pulsation dampener is disclosed in U.S. Pat. No. 3,782,418 of Jan. 1, 1974, in the name of Abduz Zahid.

SUMMARY

The present invention may be summarized as directed to an improved pulsation dampener device for interposition in the pressure line of a hydraulic system or the like. The device is characterized by its ability effectively to dampen pulses of high frequency or amplitude with a minimum of frictional losses encountered in traversing the dampener.

In accordance with the invention, a pressure vessel, divided into two chambers by a distensible diaphragm, is connected into a hydraulic circuit in such manner that the hydraulic circuit is communicated with the hydraulic chamber of the vessel responsive to pressures over a predetermined value.

The hydraulic chamber of the pressure vessel is connected to a fitting providing a by-pass conduit, the device of the invention being characterized by the formation of a conduit of progressively increasing cross-sectional area adjacent the inlet orifice of the by-pass conduit, an interposed baffle having a through-going bore at an intermediate position within the by-pass conduit, and a progressively decreasing cross-section as the fluids approach the outlet of the device, whereby the fluid velocity is progressively reduced as it enters the dampener device and increased as it leaves the device.

Accordingly, it is an object of the invention to provide an improved pulsation dampener device.

It is a further object of the invention to provide a pulsation dampener device comprising a pressure vessel divided into two chambers by a diaphragm, such as an elastomeric bladder, one said chamber being filled with gas under pressure and the other said chamber being connected to a fitting having inlet and outlet orifices. The area between the inlet and outlet orifices and in registry with the oil port, which may be closed by a valve assembly, is so constructed and arranged to have a progressively increasing and then progressively decreasing cross-section area, thereby to slow the fluid velocity as the fluid enters the inlet end and to increase the fluid velocity as the fluid leaves the output end of the fitting.

A further object of the invention is the provision of a pulsation dampener device which is susceptible, without modification, to dampening of pulses of a wide range of frequencies and amplitudes.

To attain these objects and such further objects as may appear herein or be hereinafter pointed out, reference is made to the accompanying drawings, forming a part hereof, in which.

Figure 1:
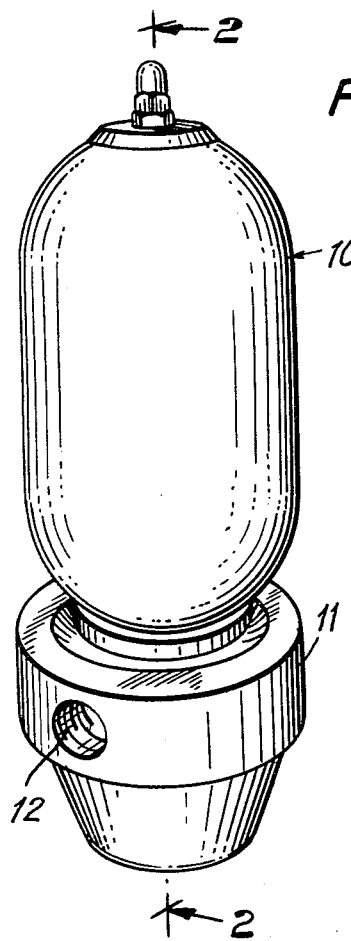
FIG. 1 is a perspective view of a pulsation dampener device in accordance with the invention.

Reference will now be made to the drawings wherein the pulsation dampener device includes generally a pressure vessel 10 secured to a fixture 11, the fixture 11 having an inlet fitting 12 adapted to be connected to the output line of a hydraulic pump or the like, and an outlet fitting 13 for conducting the pulse dampened liquids to the remainder of the hydraulic system.

The pressure vessel assembly 10, which is known per se, may include a gas chamber 14 and an oil chamber 15. The chambers 14, 15 are separated by a resilient elastomeric bladder assembly 16 having an open mouth portion (not shown) which is disposed in sealed engagement with the inner walls of the pressure vessel so as to divide the same into the said chambers 14, 15.

A gas charging valve assembly, known per se, may be fixed to the upper end 18 to the pressure vessel, the valve assembly enabling the chamber defined between the bladder and the upper end of the vessel to be charged with gas under a selected pressure.

The pressure vessel 10, at its lower end 19, includes an oil port 20. The oil port 20 may have mounted therein a plug assembly 21 carrying a valve assembly 22.

The plug assembly 21 preferably includes a beveled valve seat 23, angled to mate with the beveled side portions 24 of the valve head 25. The valve head 25 is fixed to a valve stem 26 of cylindrical external configuration, the stem 26 being slidably guided within an aperture or sleeve 27 supported on radially directed arms 28 of the bottom plate 29 of the plug assembly 21.

Figure 2:
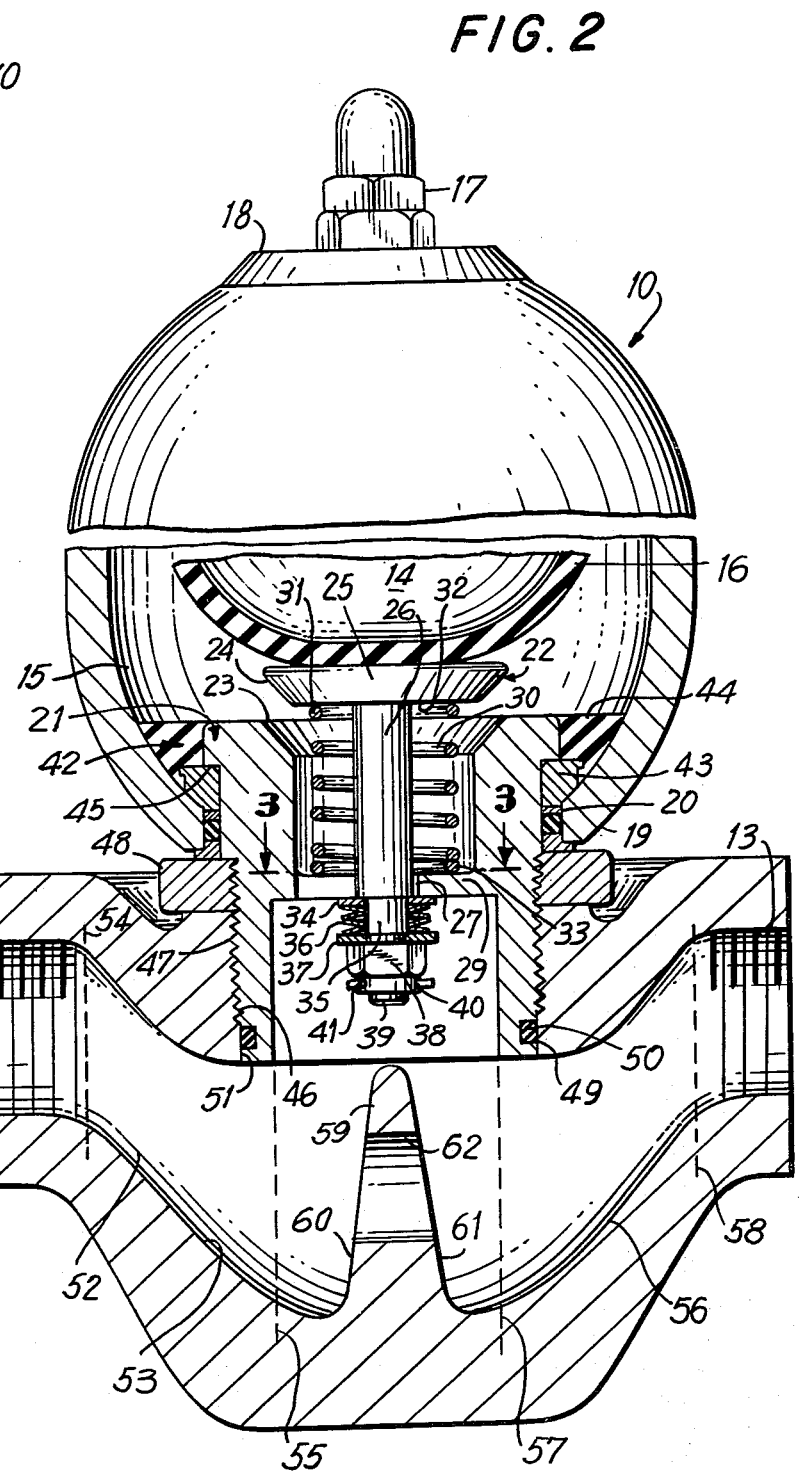
FIG. 2 is a fragmentary vertical section taken on the line 2—2 of FIG. 1.
Figure 3:
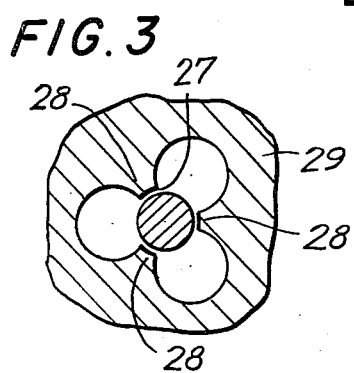
FIG. 3 is a fragmentary horizontal section taken on the line 3—3 of FIG. 2.

It will be observed that the valve stem 26 is reciprocable within the aperture 27 in a vertical direction, e.g. axially of the pressure vessel, between an upward limiting position shown in FIG. 2 and a lower limiting position whereat the valve head is seated against the beveled seat 23.

The valve assembly is biased toward its upward limiting position by a coil spring 30 surrounding the stem 26, the spring 30 having its upper end 31 biased against the under surface 32 of the valve head and its lower end 33 biased against the plate 29.

The portion of the valve stem 26 below the plate or spider 29 may include a shock absorbing mechanism including stop washer 34 sleeved over a reduced diameter portion 35 of the stem and maintained in engagement against the under surface of plate 29 by a buffer spring 36. The spring 36 is biased at its lower end against a support washer 37. The washer 37 is maintained in position by an adjustment nut 38 mounted over threaded shank 39 of the valve stem. Preferably, a lock collar 40, held by a cotter pin member 41, is engaged against the under surface of the nut 38 to prevent retrothreading thereof.

The plug assembly 21 is mounted in position within the oil port by a deformable collar assembly, generally referred to at 42, the collar assembly being preferably in accordance with the collar disclosed in hereinabove referred to U.S. Pat. No. 3,782,418. Accordingly, detailed description of the collar assembly need not be repeated here except to note that the collar assembly includes a split pair of arcuate segments 43, bonded to a rubber annulus 44, which enables the arcuate segments 43, each of which comprises 180°, to be folded about a medial line, passed inwardly through the oil port, and spring outwardly to the mounted position shown.

The plug assembly 21 includes a downwardly directed annular shoulder 45, the largest diameter of which is smaller than the diameter of the oil port, whereby the same may be passed inwardly through the oil port, but is larger than the smallest diameter of the arcuate segments 43. It is thus apparent that, for assembly, the plug may be inserted into the interior of the chamber 15 through the oil port, that thereafter the collar assembly 42 may be folded and passed through the oil port, and that thereafter, when the plug assembly is drawn downwardly, a seal is defined between the plug assembly and collar arrangement on the one hand and the collar and oil port on the other.

The plug assembly 21 includes a depending threaded neck portion 46. The attachment fixture 11 includes an upwardly open, externally threaded passage 47, into which the threaded neck portion 46 of the plug assembly is threadedly connected. A locking nut 48 is applied over the threaded portion 46, clampingly to connect the plug assembly 21 to the pressure vessel, following which the completed plug assembly and pressure vessel may be threadedly connected into the threaded passage 47, to secure the pressure vessel to the fixture 11.

In order to assure a fluid-tight seal, the neck 46 of the plug may include a recessed groove 49, carrying O-ring 50 which, in the assembled condition, bears against cylindrical portion 51 of the passage portion 47 of the fixture.

The fixture 11 includes adjacent the input fitting 12 an expansion chamber 52 which includes a downwardly directed, outwardly flaring entrance conduit 53 of progressively increasing cross-section area. Without limitation, the cross-section at the entrance plane 54 of the conduit 53 is preferably one half or less than the cross-section area at the exit plane 55 of the conduit 53.

The device includes an exit conduit 56, having a large cross-sectional entrance end at the plane 57 and constricting to an exit end at the plane 58. The conduit 56 is narrower at the exit end 58 than at the entrance end 57, the entrance and exit areas, at the planes 57 and 58, preferably bearing an inverse relation to the entrance and exit areas at the planes 54, 55, respectively—that is to say, the cross-sectional area at the plane 57 is preferably twice or more the cross-sectional area of the passage 56 at the exit plane 58.

A baffle member 59 is interposed within the fixture 11 substantially medially thereof, the baffle including upwardly inclined side walls 60, 61 and a through-going aperture 62. The cross-sectional area of the through-going aperture 62 is preferably one half or less the cross-sectional area of the entrance and exit ends of the input conduit 52 and the output conduit 56 at the planes 54 and 58, respectively.

The operation of the device will be apparent from the preceding description.

In practice, the fitting 12 of the fixture 11 is connected to the output of a pump of a hydraulic circuit and the fitting 13 connected to the hydraulic system downstream of the pulsation dampener. Liquid under pulsed pressure is admitted into the conduit 52 within the fixture. The valve head 25 will be normally urged to a downward position against the biasing force of spring 30, by virtue of the fact that the pressure within the chamber 14 exceeds the pressure within the chamber 15. However, when pulses of a magnitude sufficient to cause the pressure within the chamber 15 to exceed the pressure in the chamber 14 are experienced, the valve member 25 is lifted as a result of the combined forces of the pressure in the hydraulic system and the spring 30, enabling liquid to enter the chamber 15, compressing the gas in the bladder within chamber 14. When the pressure falls within the conduit 52 to such degree that the pressure in the gas chamber 14 is sufficiently great to overcome the combined pressures of the liquid and the force of spring 30, the valve will be returned to the seated position and energy stored in the compressed gas will be returned to the liquid under pressure.

As will be appreciated, by virtue of the progressively increasing size of the input passage 52, the velocity of liquids entering the input fitting 12 will progressively decrease as the fluids approach the baffle 59. Portions of the fluid will pass directly through the by-pass aperture 62 in the baffle and toward the exit fitting 13. Other portions of the fluid will be forced upwardly, to effect the unseating of the valve member and the transference of energy to the gas in the chamber 12.

It will further be observed that a progressive acceleration of fluids will be experienced in the progressively more constricted exit passage 56 which is narrowest at the exit plane 58.

It has been discovered that the interaction of the energy storing system provided by the gas under pressure and the decelerating and accelerating effects resulting from the shaping of the passage in the fixture 11 have a synergistic effect, providing improved pulse dampening as contrasted with similar dampener constructions wherein the cross-sectional area of the input and output conduits is essentially a constant throughout.

The device of the invention is highly effective in dampening pulses of a wide range of amplitudes and frequency ranges.

While applicant has illustrated a preferred embodiment of the invention pursuant to the requirements of the patent laws, it will be readily recognized that variations may be made in details of construction of such embodiment, without departing from the spirit of the present invention. Particularly, it is anticipated that the rate of flare and constriction of the input and output passages, respectively, may be modified in accordance with specific requirements in a given hydraulic circuit, thus to tailor the device to the anticipated conditions.

Similarly, it is anticipated that the shape of the passages may affect the performance of the system.

Accordingly, the invention is to be broadly construed within the scope of the appended claims.

Having thus described the invention and illustrated its use, what is claimed as new and is desired to be secured by Letters Patent is:

1. A pulse dampener device for hydraulic systems comprising a pressure vessel, a resilient, distensible bladder member disposed in said vessel and dividing said vessel into two discrete chambers, a gas charging port in communication with one said chamber, an oil port in communication with the other said chamber, a mounting fixture supporting said pressure vessel, said fixture including a conduit extending generally transversely to the axis of said vessel and including input and output fittings, said fixture including a passage extending downwardly from said oil port to said conduit in a direction generally axially of said vessel and having a downwardly directed entrance, a baffle member disposed in said conduit in transversely blocking position thereof, said baffle including a by-pass aperture directed substantially axially of said conduit, the cross sectional area of said aperture being less than the cross-sectional area of said conduit at said fittings, the upper end portion of said baffle being essentially coterminous with said entrance of said passage, said conduit progressively increasing in cross-sectional area in the direction from said fittings toward said baffle, the cross-sectional area of said conduit adjacent said baffle being at least about twice the cross-sectional area of said conduit at said input and output fittings, said conduit from said fittings to said baffle being inclined throughout in a downward direction generally away from said oil port.

2. A pulse dampener in accordance with claim 1 wherein the side walls of said baffle member are upwardly inclined in the direction of the axis of said pressure vessel.

3. A pulse dampener in accordance with claim 2 wherein the cross-sectional area of said conduit adjacent said baffle is four or more times the cross-sectional area of said conduit at said input and output fittings.

4. A pulse dampener in accordance with claim 3 and including a valve member interposed in said oil port and adapted to seal said oil port responsive to pressures in said gas chamber exceeding the pressures of said oil chamber by a predetermined amount, and thereby to decouple said oil port from said passage, and to unseat said oil port and communicate said port and said passage responsive to pressures in said passage exceeding the pressure in said gas chamber.

* * * * *